(12) United States Patent  
Pueffel et al.

(10) Patent No.: US 8,100,214 B2  
(45) Date of Patent: Jan. 24, 2012

(54) TWO-WHEELER, IN PARTICULAR A SCOOTER OR MOTORBIKE

(75) Inventors: Peter Pueffel, Freising (DE); Massimo Lotti, Rimini (IT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/897,391

(22) Filed: Oct. 4, 2010

(65) Prior Publication Data

US 2011/0018224 A1  Jan. 27, 2011

Related U.S. Application Data

(63) Continuation of application No. PCT/EP2009/002738, filed on Apr. 15, 2009.

(30) Foreign Application Priority Data

May 2, 2008 (DE) .......................... 10 2008 021 981

(51) Int. Cl.  
*B62D 61/02* (2006.01)

(52) U.S. Cl. ....................................................... 180/219

(58) Field of Classification Search .................... 180/219  
See application file for complete search history.

(56) References Cited

U.S. PATENT DOCUMENTS

| 5,107,949 A | | 4/1992 | Gotoh et al. | |
|---|---|---|---|---|
| 5,433,286 A | * | 7/1995 | Kumamaru et al. | 180/219 |
| 6,073,719 A | * | 6/2000 | Ohmika et al. | 180/219 |
| 6,336,579 B1 | * | 1/2002 | Sako | 224/413 |
| 6,357,542 B1 | * | 3/2002 | Sako | 180/68.5 |
| 6,499,784 B2 | * | 12/2002 | Takahashi | 296/37.1 |
| 6,612,391 B2 | * | 9/2003 | Yamauchi | 180/292 |
| 6,651,767 B2 | * | 11/2003 | Izawa et al. | 180/219 |
| 7,028,800 B2 | * | 4/2006 | Yagisawa et al. | 180/219 |
| 7,198,129 B2 | * | 4/2007 | Sakaki et al. | 180/219 |
| 7,306,277 B2 | | 12/2007 | Kamemizu et al. | |
| 7,334,556 B2 | * | 2/2008 | Wachigai et al. | 123/195 HC |
| 7,562,734 B2 | * | 7/2009 | Yano et al. | 180/219 |
| 2001/0007293 A1 | * | 7/2001 | Yamauchi | 180/219 |
| 2005/0155804 A1 | * | 7/2005 | Kamemizu et al. | 180/219 |

FOREIGN PATENT DOCUMENTS

| DE | 30 47 985 A1 | 7/1982 |
|---|---|---|
| DE | 10 2004 048 480 A1 | 5/2005 |
| EP | 1 557 348 A2 | 7/2005 |
| EP | 1 759 974 A2 | 3/2007 |
| JP | 2004-99008 A | 4/2004 |

OTHER PUBLICATIONS

International Search Report dated Oct. 5, 2009 (Three (3) pages).

* cited by examiner

*Primary Examiner* — Joanne Silbermann  
*Assistant Examiner* — Michael Stabley  
(74) *Attorney, Agent, or Firm* — Crowell & Moring LLP

(57) ABSTRACT

A two-wheeler, in particular a scooter or a motorbike, having a seat which extends over a rear wheel, is provided with a storage compartment below the seat having at least one repositionable floor element. When in a first upper position, the at least one floor element does not interfere with the movement of the rear wheel through its range of motion. When in a second lower position when the two-wheeler is not operated, the storage compartment exhibits a second, larger storage volume.

16 Claims, 1 Drawing Sheet

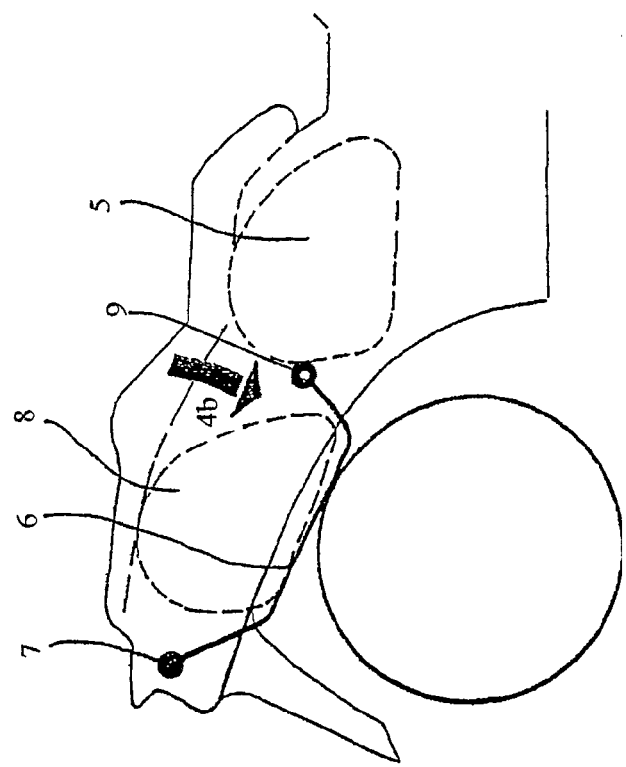
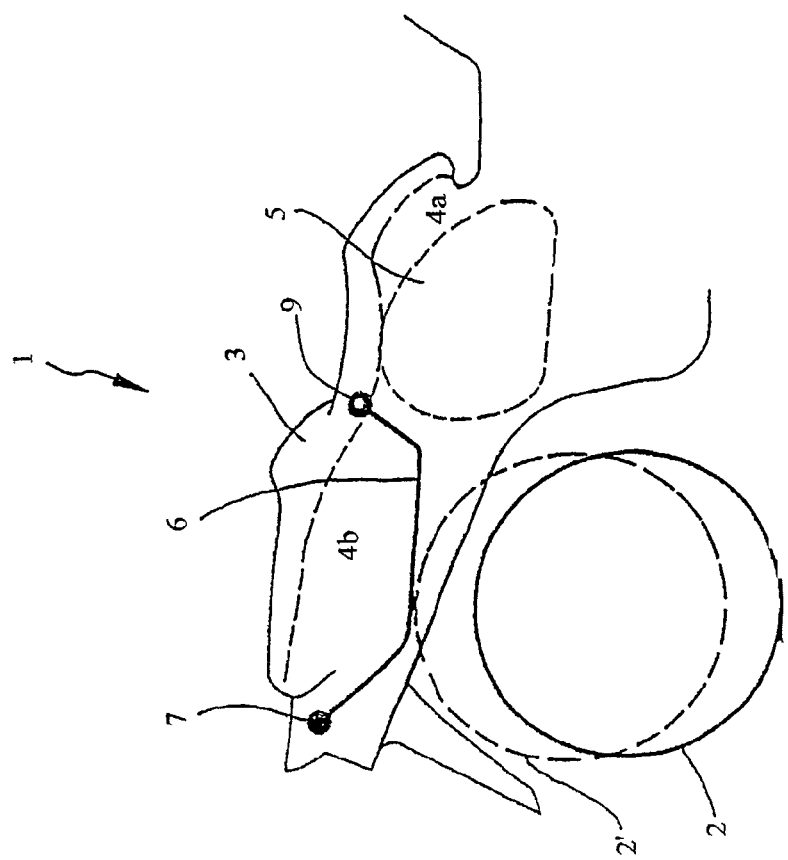
FIG. 1
FIG. 2

TWO-WHEELER, IN PARTICULAR A SCOOTER OR MOTORBIKE

This application is a continuation of PCT International Application No. PCT/EP2009/002738, filed Apr. 15, 2009, which claims priority under 35 U.S.C. §119 to German Patent Application No. 10 2008 021 981.9, filed May 2, 2008, the entire disclosures of which are herein expressly incorporated by reference.

BACKGROUND AND SUMMARY OF THE INVENTION

The present invention relates to a two-wheeler and storage therein.

DE 10 2004 048 480 A1 discloses a scooter with a seat that rises relatively steeply towards the rear. Therefore, the pillion passenger sits significantly higher than the rider. Below the seat there is a storage compartment, of which the front area, approximately below the sitting position of the rider, can house a first helmet; and the rear area, approximately below the sitting position of the pillion passenger, can house a second helmet. It is possible to accommodate the second helmet, because the seat rises, as aforementioned, in a relatively steep manner towards the rear, thus leaving a sufficiently large open space between the rear wheel and the seat.

Such a seat that rises sharply towards the rear is not always desired for design reasons.

Therefore, an object of the invention is to provide a two-wheeler that has a seat that rises comparatively gently and yet has sufficient storage space below the seat.

The starting point of the invention is a two-wheeler, in particular a scooter or a motorbike, with a rear wheel and a seat that extends as far as over the area of the rear wheel. Below the seat there is a storage compartment, which has at least one "floor element." The term "floor element" is construed in a very broad sense. What is meant is that the "floor element" defines the storage compartment or a subarea of the storage compartment downwards in the direction of the rear wheel.

The fundamental idea of the invention consists of a storage compartment having a variable storage volume. In this case the variability is achieved in that the floor element can be adjusted between a first upper position and at least one second lower position, in which the storage compartment exhibits a larger storage volume than in the first position of the floor element.

Preferably in the second lower position of the floor element the storage compartment exhibits a sufficient storage volume for accommodating a motorbike helmet.

According to a further development of the invention, the floor element in its second lower position is moved outwards as far as into the "spring travel" and/or the "spring range" of the rear wheel. Hence, the use of the larger storage volume, when the floor element is in its lower, fully extended position, is provided primarily or exclusively for states, in which the motorbike is turned off. In principle, the floor element in its second lower position can be moved outwards until it rests with its underside on a top side of the rear wheel tire, as a result of which the storage volume of the storage compartment can be maximized.

The concepts "move the floor element" or "extend or retract the floor element" are construed in a very broad sense that the floor element is moved from the one position into its other position or vice versa. For example, it can be provided that the floor element is arranged so as to be swivellable and can be swivelled back and forth between the at least two positions. The floor element can be mounted on the two-wheeler, in particular on a frame of the two-wheeler, so that said floor element can be swivelled, for example, about a transverse axis of the two-wheeler. As an alternative, it can be provided that the floor element can be displaced in an essentially translatory manner between the two positions.

The floor element may involve, for example, an essentially rigid component that is made, for example, of a synthetic plastic material. The floor element can be configured, in particular, as a trough-shaped component. It is also conceivable that the "floor" of the storage compartment is formed by several floor elements that are connected to one another in an articulated manner.

As stated above, it can be provided that the use of the larger storage volume, when the floor element is moved outwards into its second lower position, is provided primarily or exclusively for an immobilized vehicle. In order to prevent a startup when the floor element is extended downwards, a sensor can be provided that detects whether the floor element is in its lower second position. The sensor may be, for example, a Hall sensor.

If there is a respective sensor signal that indicates that the floor element is extended downwards, then it can be provided that the engine-related electronics of the two-wheeler prevents the engine of the two-wheeler from starting.

As an alternative or in addition, it can be provided that when the floor element is extended or is in the process of being extended downwards, the electronics of the two-wheel vehicle prevents the gear of the transmission from being engaged.

A further development of the invention provides that the floor element can be locked in its second, downwards extended position. Locking the floor element in its downward position can prevent the objects that are put into the storage compartment from being damaged. When the motorbike is turned off, there is the risk that a person will sit on the motorbike, a state that would result in the compression of the rear wheel. When the storage compartment is fully extended to its maximum, that is, when the floor element rests on the rear wheel tire, there is the risk that objects located in the storage compartment will be squashed and/or damaged owing to the compression of the rear wheel. If the floor element can be locked in its lower position, then a compression of the rear wheel is prevented and, as a result, the objects located in the storage compartment will not be damaged.

It can be provided that the floor element can be manually operated. For example, the floor element can be moved from its upper position into its lower position and vice versa with very little effort by means of a simple lever mechanism or the like. As an alternative, it can be provided that the floor element can be moved from its first position into its second position and/or vice versa by an electric, hydraulic or pneumatic actuator or can be "steered" in a different way.

It can be provided in a way analogous to that of conventional motorbikes or scooters that the storage compartment is accessible "from the top" by removing or swivelling the seat.

Other objects, advantages and novel features of the present invention will become apparent from the following detailed description when considered in conjunction with the accompanying drawings.

BRIEF DESCRIPTION OF THE DRAWINGS

FIG. 1 is an illustration of an embodiment of the present invention in a running condition.

FIG. 2 is an illustration of the FIG. 1 embodiment in a parking condition.

DETAILED DESCRIPTION

FIG. 1 shows the rear area of a scooter 1. The scooter 1 has a rear wheel 2. The potential "compression path" or "compression range" of the rear wheel 2 is shown by the dashed representation of the rear wheel 2.

The scooter 1 has a seat 3, which can be arranged so as to be removable or upwards swivellable. Below the seat 3 there is a storage compartment 4 comprising a front area 4a and a rear area 4b.

A helmet 5 is housed in the front area 4a of the storage compartment. The rear area 4b of the storage compartment is defined by a trough-shaped floor element 6 in the downwards direction, that is, in the direction of the rear wheel 2. The floor element 6 is arranged so as to be swivellable about a transverse axis 7 of the scooter 1.

In the position depicted in FIG. 1, the floor element 6 is in its first, upwards swivelled position, in which the rear wheel 2 is certainly not touching the floor element 6 even in the event of a maximum compression. In the upwards swivelled position, the rear storage compartment area 4b has a comparatively small storage volume.

In order to maximize the storage volume of the rear storage compartment area 4b, the floor element 6 can be swivelled downwards about its swivel axis 7 in the event that the scooter is turned off, so that an underside of the floor element 6 rests on an upper side of the rear wheel tire. In the downwards swivelled position of the floor element 6, the rear storage compartment area 4b exhibits a sufficiently large volume, so that a second helmet 8 can be stored when the motorbike is turned off.

FIGS. 1 and 2 show a sensor element 9 that detects whether the floor element 6 is or is not extended downwards. In the event that the floor element 6 is extended downwards, it can be provided that the electronics of the vehicle prevents the engine from starting and thus, from driving away. As an alternative or in addition, it can be provided that the electronics of the vehicle prevent the engagement of a gear of the transmission when the floor element 6 is extended downwards.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A two-wheel vehicle, comprising
a rear wheel;
a seat, the seat extending at least over an area above the rear wheel; and
a storage compartment arranged below the seat and having at least one displaceable floor element,
wherein the floor element has at least a first upper position which defines a first storage volume in the storage compartment, and is displaceable to at least a second lower position which defines a second, larger storage volume in the storage compartment.

2. The two-wheel vehicle as claimed in claim 1, wherein the storage compartment includes a front area that is sufficiently large to receive a first motorbike helmet stored therein.

3. The two-wheel vehicle as claimed in claim 2, wherein the storage compartment includes behind the first area a second area defined at least in part by the floor element which is sufficiently large when the floor element is in the second position to receive a second motorbike helmet.

4. The two-wheel vehicle as claimed in claim 3, wherein the rear wheel is movable relative to a frame of the two-wheel vehicle within a predefined range and the second position of the floor element is located such that the floor element is within the predefined range of rear wheel movement.

5. The two-wheel vehicle as claimed in claim 4, wherein in the second position of the floor element an underside of the floor element rests on an upper side of a tire of the rear wheel.

6. The two-wheel vehicle as claimed in claim 4, wherein the floor element is arranged to swivel between the first position and the second position.

7. The two-wheel vehicle as claimed in claim 6, wherein the floor element swivels a transverse axis of the two-wheel vehicle.

8. The two-wheel vehicle as claimed in claim 4, wherein the floor element is arranged to be displaced between the first position and the second position.

9. The two-wheel vehicle as claimed in claim 4, wherein the floor element is an essentially rigid, hard-shelled component.

10. The two-wheel vehicle as claimed in claim 4, further comprising:
a position sensor arranged to detect whether the floor element is in the second position.

11. The two-wheel vehicle as claimed in claim 10, wherein the sensor is a Hall sensor.

12. The two-wheel vehicle as claimed in claim 10, wherein when the floor element is in the second position the sensor signals the two-wheel vehicle to prevent starting of an engine of the two-wheel vehicle.

13. The two-wheel vehicle as claimed in claim 10, wherein when the floor element is in the second position the sensor signals the two-wheel vehicle to prevent engagement of a gear of the transmission.

14. The two-wheel vehicle as claimed in claim 1, wherein the floor element is lockable in the second position.

15. The two-wheel vehicle as claimed in claim 1, wherein the floor element is manually movable between the first position and the second position.

16. The two-wheel vehicle as claimed in claim 1, wherein the floor element is electrically movable between the first position and the second position.

* * * * *